(12) United States Patent
Shen et al.

(10) Patent No.: US 10,303,827 B2
(45) Date of Patent: May 28, 2019

(54) PREDICTING CRACKING IN COOLED METAL OR ALLOY COMPONENTS

(71) Applicant: Rolls-Royce Corporation, Indianapolis, IN (US)

(72) Inventors: Gangshu Shen, Carmel, IN (US); Eugene Sun, Carmel, IN (US); Stephanie M. Janicek, Mooresville, IN (US); Robert A. Ress, III, Carmel, IN (US); Brian Drier, Indianapolis, IN (US); Mark E. Bartolomeo, Brownsburg, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 235 days.

(21) Appl. No.: 15/091,086

(22) Filed: Apr. 5, 2016

(65) Prior Publication Data
US 2017/0286579 A1 Oct. 5, 2017

(51) Int. Cl.
*G06F 17/50* (2006.01)
*C21D 1/18* (2006.01)
*C21D 11/00* (2006.01)

(52) U.S. Cl.
CPC .......... *G06F 17/5018* (2013.01); *C21D 1/18* (2013.01); *C21D 11/005* (2013.01);
(Continued)

(58) Field of Classification Search
USPC .................. 703/2, 7, 10; 702/34, 37, 6, 11; 73/12.01
See application file for complete search history.

(56) References Cited

U.S. PATENT DOCUMENTS

| 4,845,328 A | 7/1989 | Storm et al. |
| 5,291,419 A * | 3/1994 | Satoh ........................ G01N 3/00 702/34 |

(Continued)

OTHER PUBLICATIONS

Gallina, "Finite Element Prediction of Crack Formation Induced by Quenching in a Forged Valve," Engineering Failure Analysis, vol. 18, No. 8, Aug. 7, 2011, pp. 2250-2259.

(Continued)

*Primary Examiner* — Thai Q Phan
(74) *Attorney, Agent, or Firm* — Shumaker & Sieffert, P.A.

(57) ABSTRACT

An example system may include a computing device including a finite element analysis module solving for a finite element model representing a component including a metal or an alloy and including a plurality of respective elements. The finite element analysis module may solve a respective stress $S_t$ and a respective temperature $T_t$ at each respective element during the predetermined cooling operating. The finite element analysis module may determine a respective impact energy $E_T$ based on the temperature $T_t$ and cooling rate, using a predetermined cooling rate-dependent energy relationship that relates a temperature of the metal or the alloy to an impact energy, determine a respective weakness index $W_t = [A \times E_T / S_t]^n$ (A being a predetermined constant, n being a predetermined real number greater than or equal to 1), and identify a respective element having a minimum weakness index less than a predetermined weakness index threshold as a cracking-prone element.

21 Claims, 4 Drawing Sheets

(52) U.S. Cl.
CPC .. *C21D 2211/001* (2013.01); *C21D 2211/008* (2013.01); *G06F 2217/16* (2013.01); *G06F 2217/80* (2013.01)

(56) References Cited

U.S. PATENT DOCUMENTS

| | | | |
|---|---|---|---|
| 5,373,143 | A | 12/1994 | Pfaffmann |
| 5,391,862 | A | 2/1995 | Amateau et al. |
| 5,433,800 | A | 7/1995 | Bishop |
| 5,666,287 | A | 9/1997 | Furumura et al. |
| 5,770,791 | A * | 6/1998 | Manahan, Sr. .......... G01H 1/12 73/12.01 |
| 5,841,033 | A | 11/1998 | Burris et al. |
| 6,419,767 | B2 | 7/2002 | Iihara et al. |
| 7,136,794 | B1 | 11/2006 | Bechhoefer |
| 7,219,044 | B1 | 5/2007 | Prevey et al. |
| 7,574,338 | B1 | 8/2009 | Kaul |
| 7,715,991 | B2 * | 5/2010 | Potdar ................ G01M 5/0033 702/34 |
| 8,875,366 | B2 | 11/2014 | Suzuki et al. |
| 9,127,998 | B1 * | 9/2015 | Guldiken ................ G01L 5/246 |
| 2010/0076738 | A1 * | 3/2010 | Dean ....................... E21B 43/26 703/7 |
| 2010/0292966 | A1 | 11/2010 | Wang et al. |
| 2014/0330525 | A1 * | 11/2014 | Nervi .................. G06F 17/5009 702/34 |
| 2015/0020924 | A1 | 1/2015 | Obayashi et al. |
| 2015/0127273 | A1 * | 5/2015 | Hongo ................... G01N 33/00 702/35 |

OTHER PUBLICATIONS

Puzak et al., "Significance of Charpy-V Test Parameters as Criteria for Quenched and Tempered Steels," Naval Research Laboratory, NRL Report 7483, Oct. 10, 1972, 21 pp.

Lee et al., "Application of Hot Press Forming Process to Manufacture an Automotive Part and its Finite Element Analysis Considering Phase Transformation Plasticity," International Journal of Mechanical Sciences, vol. 51, No. 11-12, Oct. 12, 2009, pp. 888-898.

Jesperson, "Influence of the Cooling Rate During Quenching on the Toughness at Typical Working Temperatures of Die-Casting Dies," La Metallurgia Italiana, May 2009, pp. 55-60.

Eshraghi-Kakhki et al., "Application of Polymeric Quenchant in Heat Treatment of Crack-Sensitive Steel Mechanical Parts: Modeling and Experiments," Materials and Design, vol. 32, No. 5, Dec. 15, 2010, pp. 2870-2877.

Extended Search Report from counterpart European Application No. 17160050.5, dated Aug. 11, 2017, 17 pp.

Response to EPC Communication dated Oct. 16, 2017, from counterpart European Application No. 17160050.5, filed Apr. 10, 2018, 13 pp.

Response to Examination Report dated Jul. 18, 2018, from counterpart European Application No. 17160050.5, filed Sep. 13, 2018, 28 pp.

Intent to Grant dated Oct. 31, 2018, from counterpart European Application No. 17160050.5, 76 pp.

Examination Report from counterpart European Application No. 17160050.5, dated Jul. 18, 2018, 6 pp.

Decision to Grant dated Jan. 10, 2019, from counterpart European Application No. 17160050.5, 2 pp.

\* cited by examiner

PREDICTING CRACKING IN COOLED METAL OR ALLOY COMPONENTS

GOVERNMENT RIGHTS

The present application was made with the United States government support under Contract No. N00019-02-C-3003 awarded by the United States Navy. The United States government may have certain rights in the present application.

TECHNICAL FIELD

The present disclosure generally relates to predicting cracking in cooled metal or alloy components.

BACKGROUND

A metal or alloy component may be subjected to thermal treatment including cooling or quenching for affecting metallurgical properties, for example, for increasing the strength of the component. However, the thermal treatment may introduce defects in the component, for example, by causing cracking.

SUMMARY

In some examples, the disclosure describes an example technique that includes determining, by a computing device, based on a finite element model, for each respective time of a plurality of times, a respective stress $S_t$ and a respective temperature $T_t$ at each respective element of a plurality of respective elements during a predetermined cooling operation modeled using the finite element model. The finite element model may represent a component comprising a metal or an alloy. The finite element model may include the plurality of respective elements. Each respective element of the plurality of respective elements may represent a respective geometric region of a plurality of respective geometric regions of the component. The example technique may include determining, by the computing device, a respective impact energy $E_T$ for each respective element at each respective time, based on the respective temperature $T_t$ associated with the respective element at the respective time and a predetermined cooling rate-dependent energy relationship that relates a temperature of the metal or the alloy to an impact energy of the metal or the alloy cooled by the predetermined cooling operation. The example technique may include determining, by the computing device, for each respective element at each time t, a respective weakness index $W_t = [A \times E_T/S_t]^n$. A may be a predetermined constant. The exponent n may be a predetermined real number greater than or equal to 1. The example technique may include determining, by the computing device, for each respective element of the plurality of respective elements, a minimum weakness index $W_m$ from the plurality of respective weakness indices associated with the respective element over the plurality of times. The example technique may include identifying, by the computing device, the respective element as a cracking-prone element if $W_m < W_{threshold}$, wherein $W_{threshold}$ is a predetermined weakness index threshold.

In some examples, the disclosure describes an example system. The example system may include a computing device. The computing device may include a predetermined cooling rate-dependent energy curve data module that relates a temperature of a metal or an alloy to an impact energy of the metal or the alloy cooled by the predetermined cooling operation. A finite element model may represent a component comprising the metal or the alloy. The finite element model may include a plurality of respective elements. Each respective element of the plurality of respective elements may represent a respective geometric region of a plurality of respective geometric regions of the component. The computing device may include a finite element analysis module configured to, for the finite element model representing the component including the metal or the alloy, solve for each respective time of a plurality of times, a respective stress $S_t$ and a respective temperature $T_t$ at each respective element of the plurality of respective elements during a predetermined cooling operating. The finite element analysis module may be configured to determine a respective impact energy $E_T$ for each respective element at each respective time, based on the respective temperature $T_t$ associated with the respective element at the respective time. The finite element analysis module may be configured to determine, for each respective element at each respective time, a respective weakness index $W_t = [A \times E_T/S_t]^n$. A may be a predetermined constant. The exponent n may be a predetermined real number greater than or equal to 1. The finite element analysis module may be configured to determine, for each respective element of the plurality of respective elements, a minimum weakness index $W_m$ from the plurality of respective weakness indices associated with the respective element over the plurality of times. The finite element analysis module may be configured to identify the respective element as a cracking-prone element if $W_m < W_{threshold}$, wherein $W_{threshold}$ is a predetermined weakness index threshold.

In some examples, the disclosure describes an example computer readable storage medium that may include instructions that, when executed, cause at least one processor to, determine, based on a finite element model representing a component including a metal or an alloy, for each respective time of a plurality of times, a respective stress $S_t$ and a respective temperature $T_t$ at each respective element of a plurality of respective elements during a predetermined cooling operation. The finite element model may include the plurality of respective elements. Each respective element of the plurality of respective elements may represent a respective geometric region of a plurality of respective geometric regions of the component. The example computer readable storage medium that may include instructions that, when executed, cause at least one processor to determine a respective impact energy $E_T$ for each respective element at each respective time, based on the respective temperature associated with the respective element at the respective time and a predetermined cooling rate-dependent energy relationship that relates a temperature of the metal or the alloy to an impact energy of the metal or the alloy cooled by the predetermined cooling operation. The example computer readable storage medium may include instructions that, when executed, cause at least one processor to determine, for each respective element at each respective time, a respective weakness index $W_t = [A \times E_T/S_t]^n$. A may be a predetermined constant. The exponent n may be a predetermined real number greater than or equal to 1. The example computer readable storage medium may include instructions that, when executed, cause at least one processor to determine, for each respective element of the plurality of respective elements, a minimum weakness index $W_m$ from the plurality of weakness indices associated with the respective element over the plurality of times. The example computer readable storage medium may include instructions that, when executed, cause at least one processor to identify the respective element as a cracking-prone element if $W_m < W_{threshold}$, wherein $W_{threshold}$ is a predetermined weakness index threshold.

The details of one or more examples are set forth in the accompanying drawings and the description below. Other features, objects, and advantages will be apparent from the description and drawings, and from the claims.

DETAILED DESCRIPTION

The disclosure describes example systems and techniques for predicting and reducing or substantially preventing cracking in cooled metal or alloy components. Techniques for fabricating metal or alloy components may include thermal processing, for example, quenching, for modifying properties of the component, such as increasing strength. Quenching may involve subjecting a heated metal or alloy component to a cooling environment for rapidly reducing the temperature of the component. Depending on the geometry of the component, different regions of the component may experience different local cooling rates and temperature gradients, leading to the development of residual stresses that may be unevenly distributed through the component. While quenching may improve the strength or hardness of the component as a whole, the development of sharp gradients in the temperature or stress profile within the component during quenching may result in local weakness in certain regions, which may consequently crack. Even minor cracks may render the entire component unsuitable for its intended purpose, for example, for components that experience stress during use, which may cause growth of the crack. Thus, predicting cracking-prone locations of components may help in reducing or substantially preventing cracking, for example, by using quench shields that may reducing or substantially prevent the formation of extreme temperature and stress profiles at the cracking-prone locations. While an analysis of stress and temperature profiles may be used in techniques for predicting cracking, relying on only stress states or temperature profiles or gradients for predicting crack initiation may result in an incomplete or inaccurate prediction of crack location, density, and propagation. This is because quench cracking typically depends on both the stress states and material's cooling rate dependent toughness, which may be represented by the cooling rate-dependent impact energy.

In accordance with examples of this disclosure, evaluating local cooling rate-dependent toughness, in addition to stress states, may allow for increased accuracy in predicting cracking-prone locations for components to be quenched at predetermined cooling rates, and reducing or substantially preventing cracking at the cracking-prone locations. Local cooling rate-dependent toughness may be determined at different regions or locations of a component by evaluating a weakness index that combines stress metrics with impact energy metrics. In particular, a computing device may develop a finite element model of the component to be quenched. The computing device may perform finite element analysis to solve for stresses and temperatures of respective elements of the finite element model when the finite element model is used to model cooling of the component at a predetermined cooling rate along successive time steps. The computing device may determine a weakness index as an exponent of a constant times an impact energy divided by a stress for each respective element of the finite element model during cooling at each respective time step.

The impact energy may be a cooling rate-dependent impact energy that may be based on the temperature of the component and the composition of the metal or alloy in the component. For example, for a particular metal or alloy, the impact energy may be represented by a plurality of energy curves, each of which is a function of temperature (e.g., a respective energy curve for each respective cooling rate). The computing device may look up the impact energy for an element based on the temperature of the element at a particular time step of the finite element analysis, based on the cooling rate, and based on the metal or alloy in the component, from an impact energy database or lookup table. For example, a cooling rate-dependent impact energy curve or table may have been generated by performing impact testing on test coupons cooled at cooling rates the same or substantially the same as the cooling rate to which the component is to be subjected. The test coupons may include the same metal or alloy as the component. Thus, the impact energy database may include predetermined energy curves that corresponding to predetermined cooling rates for predetermined metals or alloys.

The computing device may determine the weakness index at a plurality of elements of the finite element model as the model is used to represent cooling the component at a predetermined cooling rate over successive time steps. The computing device may identify elements for which the minimum of the weakness index during cooling is less than a predetermined threshold as cracking-prone elements. Cracking-prone elements may correspond to geometrical regions or locations of the component that may be prone to cracking during the quenching technique. Once the computing device has identified cracking-prone regions of the component, cracking may be mitigated, for example, by using quench shields, plugs, or caps, that may prevent the formation of sharp stress or temperature gradients in the vicinity of the cracking-prone regions, thus reducing or substantially avoiding the formation of cracks. The finite element model may also be used to analyze the effect of quench shields, plugs, or caps on cracking.

Figure 1:
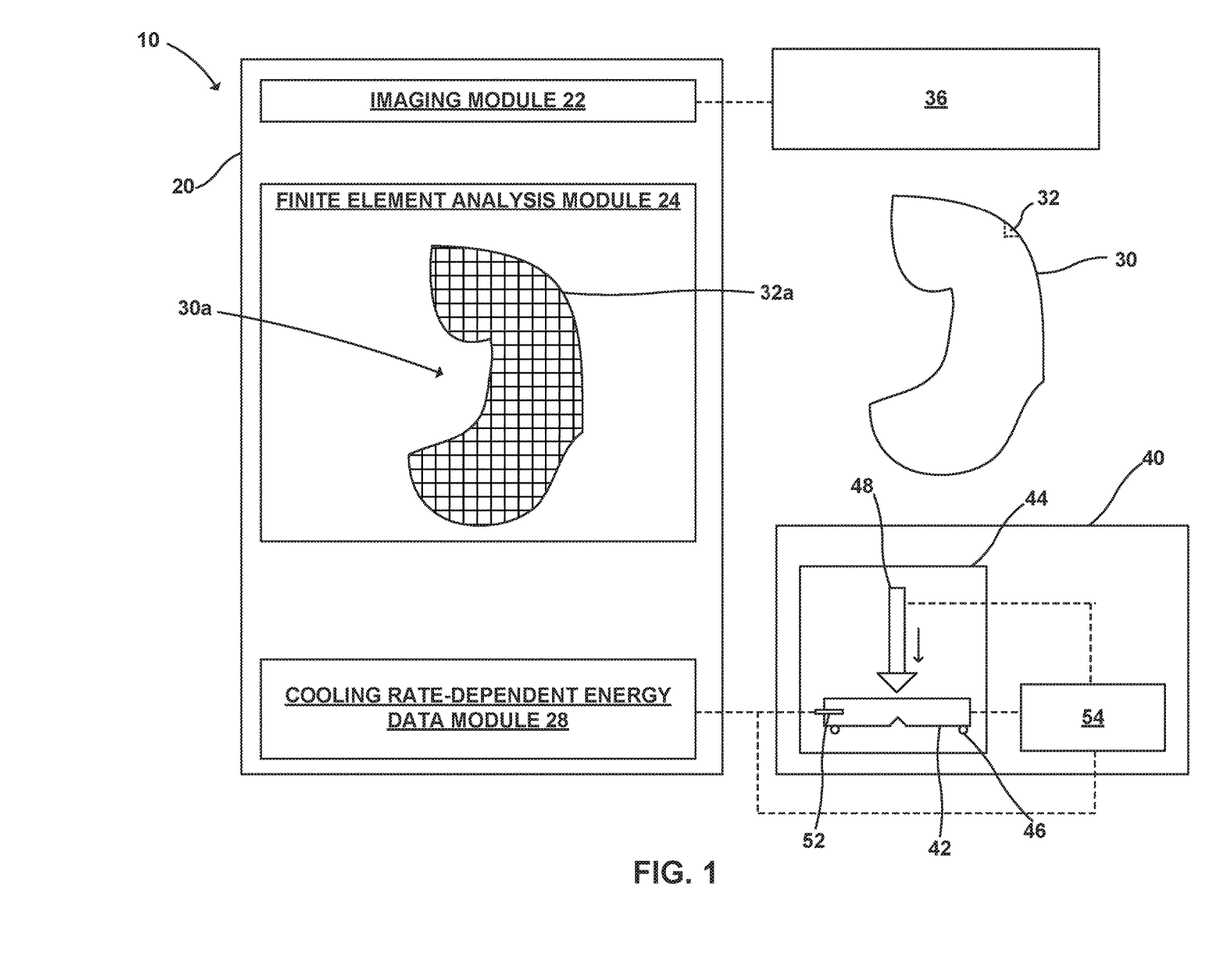
FIG. 1 is a conceptual and schematic block diagram illustrating an example system for predicting and preventing cracking in a cooled component.

FIG. 1 is a conceptual and schematic block diagram illustrating an example system 10 for predicting cracking in a cooled component. System 10 may include a computing device 20. In some examples, system 10 may optionally include one or more of an imaging device 36, a component 30, and an energy curve calibration system 40.

Computing device 20 may include a finite element analysis module 24 that determines a finite element model 30a of component 30. Finite element model 30a may include a plurality of elements, for example, element 32a, each element 32a of the plurality of elements corresponding to a respective geometric region of component 30, for example, geometric region 32 of component 30. The number of elements 32a in finite element model 30a may be preset or selected (e.g., by a user and input into computing device 20) based on a desired resolution of information within finite element model 30a.

In some examples, computing device 20 may include an imaging module 22. Imaging module 22 may control imaging device 36. In some examples, imaging module 22 may control imaging device 36 to capture at least one image of component 30. Computing device 20, e.g., imaging module 22, may be configured to generate finite element model 30a based on the at least one image of component 30. In some examples, imaging device 36 may include a sensor, a CCD (charge-coupled device), a laser scanner, or a camera for capturing at least one image of component 30, and provide image data to imaging module 22 for generating finite element model 30a of component 30.

Thus, in some examples, finite element model 30a may include a digital or mathematical representation of component 30. Finite element model 30a may include any suitable finite element representation of component 30, for example, a mesh-based or grain-based model of component 30. Thus, finite element model 30a may include a data structure including representations of the location of centers of elements or nodes, their shapes, their distribution, inter-node distance, and connections between elements. Finite element model 30a may also include data representing the characteristics of the composition of matter included within the geometric region that a respective element represents, such as heat capacity, coefficient of thermal expansion, Young's modulus, or other chemical, mechanical, or metallurgical characteristic. Finite element model 30a may further include data representing the state, for example, the stress state and temperature, of each element 32a. Further, finite element model 30a may include additional data associated with each element 32a of the plurality of elements in finite element model 30a, such as a weakness index.

Finite element model 30a may include a data set including the state of each element, including data on a state of each element 32a at a present time, and also may include respective data associated with the state of each element 32a at other times, including past times or future times. Thus, finite element model 30a may represent the state of each element 32a at each respective time of a plurality of times. In some examples, finite element model 30a may initially only include an initial state of each element 32a, and finite element analysis module 24 may determine future states of respective elements 32a by stepping finite element model 30a through time, for example, by solving equations representing relationships between parameters of each element 32a and its neighbors, at each time step of a series of time steps.

Finite element analysis module 24 may be configured to simulate exposing finite element model 30a to predetermined environmental conditions. For example, finite element analysis module 24 input boundary conditions to finite element model 30a that simulate a cooling environment to simulate a predetermined cooling operation, such as cooling component 30 at a predetermined cooling rate. While finite element analysis module 24 of example system 10 is described herein as inputting boundary conditions to finite element model 30a that simulate a cooling environment, finite element analysis module 24 may also input other boundary conditions to finite element model 30a (e.g., selected elements 32a of finite element model 30a), such as a high temperature, a stress, a force, or the like.

Computing device 20 also may include cooling rate-dependent energy curve data module 28. Cooling rate-dependent energy curve data module 28 may include data relating cooling rate, temperature, and metal or alloy composition to impact energy. In some examples, cooling rate-dependent energy curve data module 28 may include data corresponding to the behavior of predetermined metals or alloys, for example, martensitic steel, or other alloys having predetermined compositions as a function of temperature in response to at least one cooling rate. In some examples, cooling rate-dependent energy curve data module 28 may include data corresponding to predetermined cooling rates, for example, a high cooling rate, a medium cooling rate, and a low cooling rate. In some examples, cooling rate-dependent energy curve data module 28 may include data corresponding to low cooling rates for martensitic steels, for example a magnitude of $10^{0\circ}$ F./s. In some examples, cooling rate-dependent energy curve data module 28 may include data corresponding to high cooling rates for martensitic steels, for example a magnitude of $10^1$ to $10^{20\circ}$ F./s.

In some examples, system 10 may include energy curve calibration system 40 for obtaining data in cooling rate-dependent energy curve data module 28. Energy curve calibration system 40 may include an impact probe 48 for subjecting a test coupon 42 having a predetermined composition to a predetermined impact force. Test coupon 42 may include a metal or alloy, for example, the metal or alloy in component 30. Energy curve calibration system 40 may include a cooling bath 44 for cooling test coupon 42 cooling at a predetermined cooling rate, a temperature sensor 52 for monitoring a temperature of test coupon 42, and energy sensor 54 for sensing the impact energy of test coupon 42 after impact from impact probe 48. In some examples, energy sensor 54 may indirectly sense impact energy, for example, by monitoring the displacement of impact probe 48.

Energy curve calibration system 40 may be used to perform impact tests such as Charpy tests, Izod tests, or other suitable impact tests. For example, test probe 48 may include a Charpy probe, an Izod probe, or any other probe suitable for a predetermined impact energy test, and test coupon 42 may be provided with a shape or geometry suitable for the predetermined test. In the example energy curve calibration system 40 shown in FIG. 1, test coupon 42 is provided a V-notch, and is supported by supports 46, for performing Charpy testing. However, in some examples, test coupon 42 may have any other suitable shape and may be supported by any suitable support appropriate for a selected impact testing technique. Thus, in some examples, energy curve calibration may obtain impact energy data for a particular metal or alloy, cooled at a predetermined cooling rate, at different temperatures, and provide the data to cooling rate-dependent energy data module 28. Computing device 20, for example, cooling rate-dependent energy data module 28, may receive the data collected by energy curve calibration system 40 and store the data in a data structure for use in techniques described herein.

Computing device 20 may include any finite element software package known in the art, and the finite element software package may include one or more of imaging module 22, finite element analysis module 24, or finite element model 30a. Computing device 20, such as imaging module 22, may develop a finite element model 30a of component 30. Finite element analysis module 24 may simulate the predetermined cooling operation of finite element model 30a, for example, imposing selected integrative boundary conditions applied to a set of partial differential equations representing properties of elements 32a of finite element model 30a, on selected respective elements 32a of finite element model 30a. In some examples, the boundary conditions may include a predetermined constant temperature assigned to elements 32a in an outer layer of finite element model 30a at each respective time, for simulating exposing the finite element model 30a to an external environment maintained at the predetermined constant temperature. Thus, at each respective time, elements 32a in the outer layer of finite element model 30a will continue to exhibit the predetermined constant temperature. For example, the predetermined constant temperature may be a temperature sufficiently lower than an average temperature of finite element model 30a that simulates cooling or quenching of finite element model 30a. Finite element analysis module 24 may determine a respective stress $S_t$ and a respective temperature $T_t$ at each respective element 32a for each respective time during the cooling operation, based on the properties of the metal or alloy in component 30. For example, finite element analysis module 24 may integrate partial differential equations relating the stress and temperature of elements 32a to the composition of component 30.

Finite element analysis module 24 also may determine, based on the respective temperature $T_t$ at a respective time, a respective impact energy $E_T$ of respective element 32a. For example, finite element analysis module 24 may look up a value of impact energy $E_T$ associated with a respective temperature $T_t$ of element 32a at a respective time from a look-up table or database relating $E_T$ as a function of cooling rate and temperature for a given metal or alloy. In some examples, finite element analysis module 24 may query cooling rate-dependent energy curve data module 28 to receive $E_T$ based on $T_t$ and the cooling rate at each respective time t, for a known metal or alloy.

Finite element analysis module 24 may determine a weakness index $W_t=[A \times E_T/S_t]^n$ for each respective element 32a at each respective time. A may be a predetermined constant, with a magnitude that may depend on n. For example, A may have a magnitude of about $10^1$ when n=2. However, the magnitude of A may change, when n changes. The exponent n may be a real number greater than or equal to 1, for example, about 2 (1.9 to 2.1) or 2. The respective weakness index $W_t$ is an index associated with the respective element 32a indicating the propensity of respective element 32a for cracking. For example, finite element analysis module 24 may determine, for each respective element 32a, a minimum weakness index $W_m$ of the plurality of weakness indices $W_t$ associated with respective element 32a over the plurality of times. Finite element analysis module 24 may identify the respective element 32 as a cracking-prone element if $W_m < W_{threshold}$, a predetermined weakness index threshold. The magnitude of $W_{threshold}$ may be material dependent, for example, in an order of magnitude of about $10^{-2}$ for Martensitic steels (in English units). However, the magnitude of $W_{threshold}$ may depend, for example, on the units in which $E_T$ and $S_t$ are measured. Finite element analysis module 24 may identify a respective geometric region of component 30 represented by respective element 32a as a cracking prone geometric region of component 30. For example, finite element analysis module 24 may set a respective flag variable associated with the respective element 32a, or may display a representation of finite element model 30a, while highlighting the location of the respective cracking-prone element 32a, or may display or otherwise output coordinates representing a physical location on component 30 corresponding to the location of element 32a in the finite element model 30a. Thus, example system 10 may be used for predicting cracking in component 30, and for preventing cracking at cracking-prone regions of component 30 when component 30 is cooled or quenched at the predetermined cooling rate, as described with reference to the example system of FIG. 2 and the example technique of FIG. 3 below. For example, system 10 may be used to predict cracking-prone locations of quenched components using a computational representation of a component, avoiding the need to physically quench the actual component itself to determine the propensity of the component for cracking. Further, the effect of many different candidate cooling operations on cracking may be evaluated in relatively short periods of time, without actually subjecting the component to the candidate cooling operations. Additionally, the simulated cooling operation of a computational representation of a component may be significantly faster than an actual cooling operation of a physical component. Thus, example system 10 may be used to perform accelerated testing on various component designs to determine cracking-prone locations for different component designs. While stress and temperature at a respective location of a component being cooled by a cooling operation may influence cracking at the respective location, other properties may influence the propensity for cracking at the respective location. For example, a cooling rate-dependent impact energy may influence the propensity for cracking. Thus, in addition to stress and temperature states, example system 10 may use impact energy-based assessments, for example, a weakness index based on both a stress and a temperature- and cooling rate-dependent impact energy, to determine cracking-prone locations. Further, Charpy energy is a particular type of impact energy that may be used to determine propensity for cracking at a respective location of a component. For example, example system 10 may determine a weakness index based on Charpy energy and stress at different locations to identify locations having a minimum weakness index over a cooling operation less than a predetermined threshold weakness as a cracking-prone location.

Figure 2:
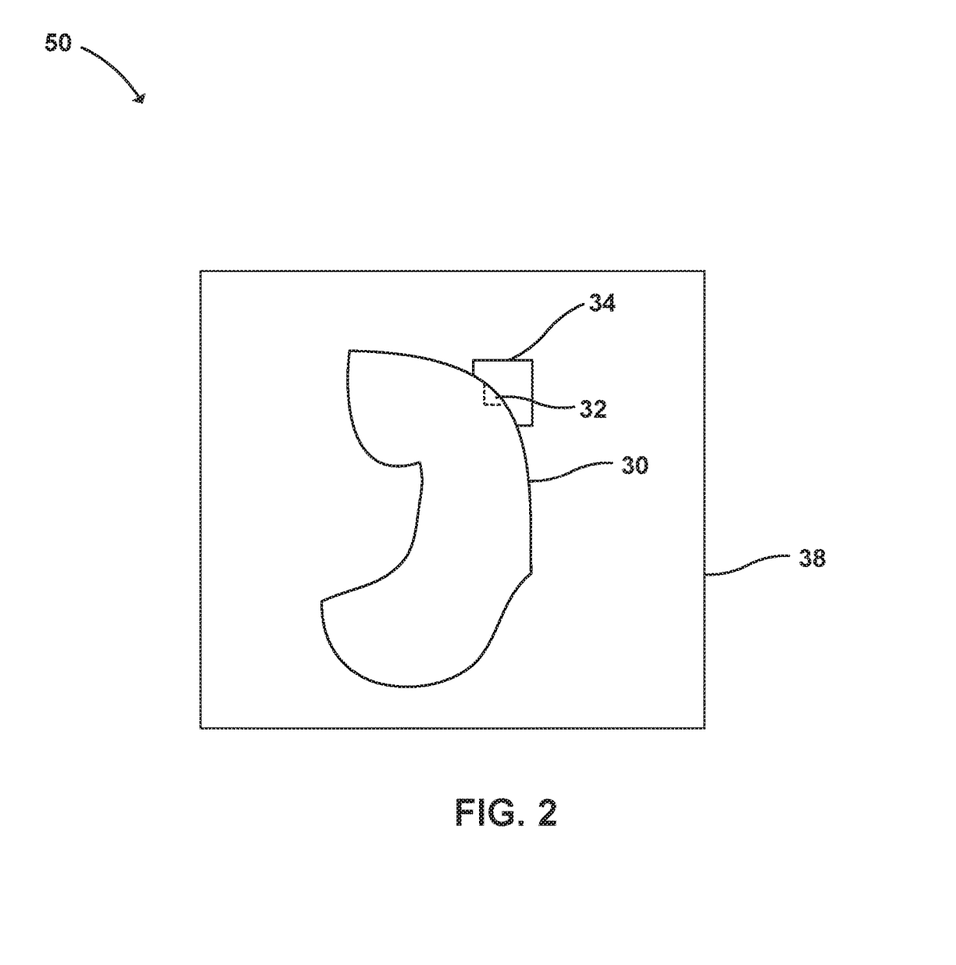
FIG. 2 is a conceptual and schematic block diagram illustrating an example system for cooling a component.

The example system of FIG. 1 may be used to determine a cracking-prone region 32 of component 30 corresponding to a respective cracking-prone element 32a of finite element model 30. FIG. 2 is a conceptual and schematic block diagram illustrating an example system 50 for cooling component 30 while preventing cracking, for example, by constructing a shield 34 to shield the cracking-prone region 32 of component 30, and then providing component 30 with shield 34 during the cooling operation to prevent cracking. Example system 50 may include a cooling bath 38 for cooling component 30 at a predetermined cooling rate. In some examples, cooling bath 38 may include a volume of static fluid or a flow of flowing fluids, for example, gases such as air, nitrogen, carbon dioxide, or any suitable gas or gaseous mixture, or liquids such as water, oil, or any other suitable quenching liquids, for cooling component 30. Cooling bath 38 may include a temperature sensor (not shown) for monitoring the temperature of cooling bath 38. A second sensor may be attached to or embedded in component 30 for monitoring the temperature of component 30. A shield 34 may be provided on component 30 to shield region 32 of component 30 from cracking during the cooling. For example, region 32 may have been identified as a cracking-prone region by example system 10 of FIG. 1, and shield 34 may have a shape or configuration designed to affect cooling at or near region 32, for example, by smoothening a temperature or stress gradient, to prevent cracking at region 32. Shield 34 may include a shield, plug, plate, cap, or any other suitable quench or cooling shield having a geometry predetermined to reduce cracking at region 32. Shield 34 may include metal or alloy that may be the same or different from metal or alloy in component 30. In some examples, example system 50 may include a plurality of shields that includes shield 34. Thus, shield 34 may be used to prevent cracking of component 30 during cooling, for example, during quenching. In some example techniques, computing device 20 of example system 10 of FIG. 1 may control example system 50 of FIG. 2, to cool component 30 by the predetermined cooling operation, while avoiding or reducing cracking, as described below. For example, computing device 20 of example system 10 may control system 50 of FIG. 2, for example, by controlling a relative position, configuration, or orientation of component 30, provided with shield 34, with respect to cooling bath 38, by controlling the temperature and cooling operation of cooling bath 38, and by detecting signals from a temperature sensor or a temperature sensor array in contact with or adjacent component 30 or cooling bath 38. Thus, after predicting a cracking-prone region 32 of component 30, shield 34 may be provided on component 30 to prevent cracking at cracking-prone region 32, and computing device 20 may control the cooling operation of the shielded component 30. Computing device 20 may implement the example technique of FIG. 3 for predicting whether region 32 of component 30 is a cracking-prone region.

Figure 3:
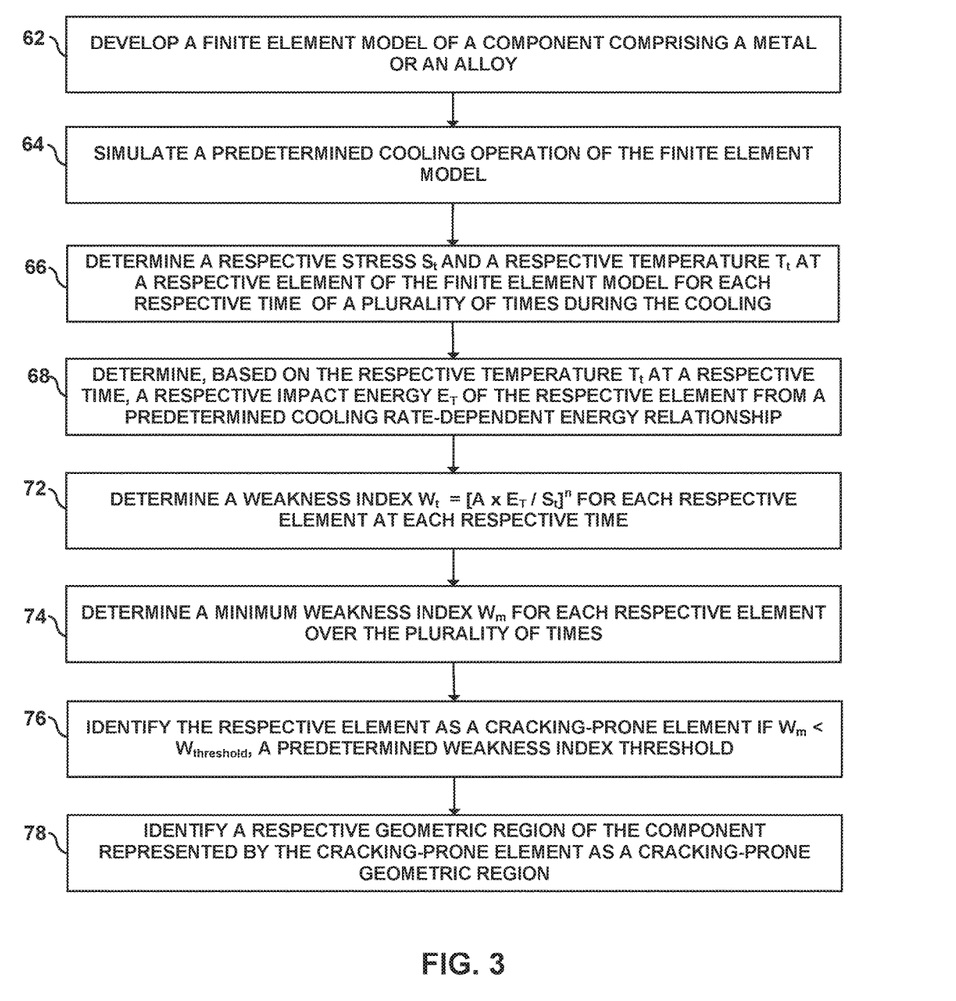
FIG. 3 is a flow diagram illustrating an example technique for predicting and preventing cracking in a cooled component.

FIG. 3 is a flow diagram illustrating an example technique for predicting a cracking-prone region in a cooled component. The example technique of FIG. 3 may partly or wholly be performed by example system 10 of FIG. 1 or by example system 50 of FIG. 2, and is described in some examples below with reference to example system 10 and example system 50. However, in some examples, one or more steps of the example technique of FIG. 3 may be performed by other example systems.

The example technique of FIG. 3 includes executing, by computing device 20, imaging module 22 to develop finite element model 30a from a plurality of images of component 30 (62). In some examples, imaging module 22 may develop or generate finite element model 30a from an image or a plurality of images of component 30, or from geometric data describing component 30, for example, a wire-frame model or a CAD (computer aided design) model. In some examples, computing device 20 may control imaging device 36 to capture and provide digital images to imaging module 22. In some examples, digital images representing component 30 may be provided to imaging module 22 or computing device 20 from a memory storage device, or from a network, internet, or cloud-hosted repository of images. In some examples, imaging module 22 may convert the digital images to a CAD model, or a data set representing component 30, for example, a wire-frame model. However, in some examples, step 62 may be omitted, and computing device 20 may receive finite element model 30a representing component 30, for example, from a data storage device, a network, the internet, or a cloud-hosted repository of finite element models.

While computing device 20 may execute finite element analysis module 24 to calculate the state of finite element model 30a at different time steps (66), computing device 20 may additionally control finite element analysis module 24 to subject finite element model 30a to simulated predetermined environmental conditions. In some examples, the example technique of FIG. 3 includes, by computing device 20, simulating cooling of finite element model 30a by a predetermined cooling operation (64). For example, finite element analysis module 24 may model subjecting finite element model 30a to a cooling environment that tends to cool finite element model 30a at a predetermined cooling rate, for example, by setting appropriate boundary conditions for respective elements 32a of finite element model 30a.

In some examples, finite element analysis module 24 may subject finite element model 30a to a suitable boundary condition to simulate cooling or quenching of finite element model 30a by a predetermined cooling operation, for example, cooling finite element model 30a at a predetermined cooling rate. For example, finite element analysis module 24 may set the temperature of elements at surface regions of finite element model 30a to a predetermined low temperature at each time step, and calculate the state of each respective element of elements 32a of the finite element model 30a subjected to that boundary condition. Thus, in some examples, finite element analysis module 24 may continue to set the temperature of an outer layer elements 32a of finite element model 30a, that may correspond to an outer surface of object 30, to a constant low temperature, to simulate exposing object 30 to a cooling environment at that temperature.

The example technique of FIG. 3 may optionally include setting, by finite element analysis module 24, other boundary conditions. For example, finite element analysis module 24 may simulate applying a high temperature to component 30, applying force or stress at selected regions of component 30 by setting parameters of selected elements of finite element model 30aat predetermined states. For example, the selected elements may include elements at a peripheral region of finite element model 30a, elements within a plane crossing finite element model 30a, elements within a predetermined region of finite element model 30a, elements that may relatively close to or remote from other elements, or any other suitable group of elements for imparting a boundary condition. In some examples, finite element analysis module 24 may apply space-dependent, time-dependent, or both space- and time-dependent boundary conditions to elements 32a of finite element model 30a. For example, elements 32a in an outer layer may be set to predetermined constant, continuously increasing, continuously decreasing, or fluctuating temperatures to simulate exposing finite element model 30a to the respective external temperature condition. Elements 32a in an inner region of finite element model 30a may be set to predetermined constant, continuously increasing, continuously decreasing, or fluctuating temperatures, for example, to simulate passing cooling or heating fluids through component 30. Elements 32a in a selected region of finite element model may be set to predetermined constant, increasing, decreasing, or fluctuating stresses to simulate external forces applied by a component of the cooling system, or an internal force applied by a platform or pillar supporting component 30. While different elements of finite element model 30a may be at different temperatures at a given time t, and different elements may cool at different local cooling rates, computing device 20 may determine an average or other statistical quantity representing the temperature of finite element model 30a as a whole, at each time t, and thus, computing device 20 may determine the cooling rate of finite element model 30a as a whole during the cooling operation.

The example technique of FIG. 3 may include determining, by finite element analysis module 24, a stress $S_t$ and a temperature $T_t$ at each respective element of the plurality of respective elements 32a at a respective time (t) of a plurality of respective times (66). In some examples, finite element analysis module 24 may determine the state of the finite element model 30a subjected to predetermined boundary or initial conditions by solving partial differential equations, for example, partial differential equations governing heat and stress distribution within finite element model 30a. For example, partial differential equations (PDEs) may represent the properties of elements such as stress and temperature, and initial or boundary conditions may be known, for example, the stress and temperature at an initial time. Thus, finite element analysis module 24 may solve the PDEs, for example, using conventional integration or numerical techniques, to determine the state (by determining the magnitude of properties such as temperature and stress) of each element 32a at predetermined steps of time, subjected to appropriate boundary conditions. The values of respective elements of plurality of elements 32a may serve as inputs in subsequent time steps. Thus, finite element analysis module 24 may obtain the state of the finite element model 30a over a series of successive time steps from finite element analysis module 24.

The example technique of FIG. 3 may include, at each respective time t, for each respective element 32a, determining, by finite element analysis module 24, a respective impact energy $E_T$ of each respective element 32a, based on the temperature $T_t$ of the respective element and a predetermined cooling rate-dependent energy curve data module 28 (68). For example, finite element analysis module 24 may retrieve impact energy for element 32a at time t, based on the metal or alloy in component 30, or the metal or alloy in region 30a (represented by element 32a) in particular, the temperature of element 32a at that time t, and the cooling rate at which cooling module 26 models cooling of finite element model 32a. For example, predetermined cooling rate-dependent energy curve data module 28 may include a database, a look-up table, or an equation representing the cooling curve energy relation, or any other digital representation associating a temperature $T_1$ of a given metal or alloy with an impact energy of the metal or alloy at that temperature $T_t$, when the metal or alloy is cooled by the predetermined cooling operation. Thus, finite element analysis module 24 may communicate the identity of the metal or alloy, the predetermined cooling rate or cooling operation, and the temperature $T_t$ to predetermined cooling rate-dependent energy curve data module 28, and in response, predetermined cooling rate-dependent energy curve data module 28 may communicate the magnitude of the impact energy $E_c$ associated with that metal or alloy cooled by the predetermined cooling operation, at the respective temperature $T_t$ to finite element analysis module 24.

In some examples, cooling rate-dependent energy curve data module 28 may include data corresponding to discrete temperatures, and computing device 20 may perform mathematical interpolation or extrapolation to determine data for temperatures falling between discrete temperatures stored in cooling rate-dependent energy curve data module 28. For example, cooling rate-dependent energy curve data module 28 may include impact energy data for temperatures ranging from 400 to 800° C., at temperature intervals 20° C. apart. As an example, computing device 20 may interpolate impact energy data at a temperature of 523° C. by looking up respective impact energies at 520 and 540° C. from cooling rate-dependent energy curve data module 28. In some examples, computing device 20 may set or update data in cooling rate-dependent energy curve data module 28 by obtaining data from energy curve calibration system 40, as described below with reference to the example technique of FIG. 4. In some examples, an operator may update data in cooling rate-dependent energy curve data module 28 from a database, from a memory storage device, or from a network, Internet, or cloud-hosted database. In some examples, cooling rate-dependent energy curve data module 28 may be updated by automated means from a database, from a memory storage device, or from a network, internet, or cloud-hosted database.

In some examples, the example technique of FIG. 3 may include, for each respective element 32a at each respective time t, determining, by finite element analysis module 24, a weakness index $W_t=[A \times E_T S_t]^n$ (72). A may have a magnitude that may represent the properties of the metal or alloy in component 30. In some examples, the exponent n may be a real number greater than or equal to 1, for example, about 2, or between 1.9 to 2.1, or 2. In some examples, finite element analysis module 24 may select a magnitude of A based on the magnitude of n. For example, A may be about $10^1$ when n is about 2. Computing device 20 may update the state of finite element model 30a based on calculations performed by finite element analysis module 24, and may obtain a stress $S_t$ and a temperature $T_t$ of element 32a from the updated finite element model 30a (66). For example, computing device 20 may provide the values one or more of $S_t$, $T_t$, $W_t$, and $E_T$ of an element at one time step as an input to finite element analysis module 24 for determining the state of the element at the next time step, and may update $S_t$, $T_t$, $W_t$, and $E_T$ for each element based on the respective outputs received from finite element analysis module 24 for the next time step. Thus, computing device 20 may update the state of finite element model 30a over a series of time steps using finite element analysis module 24.

In some examples, the example technique of FIG. 3 may include, for each element 32a of the plurality of elements, determining, by finite element analysis module 24, a minimum weakness index $W_m$ from the plurality of weakness indices determined for element 32 over the plurality of times (74). For example, for each element 32a, finite element analysis module 24 may assign a relatively high initial default value to a variable storing the minimum weakness index for element 32a, and update the variable each time the weakness index for element 32a is determined to be lower than the previously stored minimum index value in the variable. Thus, at the end of a simulation run cooling the finite element model 30a over a series of time steps, computing device 20 may retrieve the minimum weakness index $W_m$ from the variable at the end of the simulation run. Computing device 20 may determine a plurality of minimum weakness indices, each minimum weakness index of the plurality of minimum weakness indices corresponding to the minimum weakness index over the simulation run for a respective element 32a of the plurality of elements.

In some examples, finite element analysis module 24 may identifying the respective element 32a as a cracking-prone element if $W_m < W_{threshold}$ (76). $W_{threshold}$ is a predetermined weakness index threshold. The magnitude of $W_{threshold}$ may be material dependent, for example, in an order of magnitude of $10^{-2}$ for Martensitic steels (when $E_T$ and $S_t$ are measured in English units). In some examples, finite element analysis module 24 may select a magnitude of $W_{threshold}$ based on the magnitude of the exponent n. Thus, at the end of the simulated cooling of finite element model 30a, finite element analysis module 24 may identify at least one element, for example, element 32a, as a cracking-prone element. For example, finite element analysis module 24 may identify element 32a as a cracking-prone element by assigning a predetermined value, such as binary 1, to a flag variable corresponding to element 32a. Thus, all elements that correspond to flag variables assigned the predetermined value may be identified as cracking-prone elements. In some examples, no element of the plurality of elements may be identified as a cracking-prone element, indicating that the conditions of cooling are not predicted to result in any cracking in component 30 represented by finite element model 30a.

In some examples, the example technique of FIG. 3 may further include identifying, by computing device 20, a respective geometric region 32 of the plurality of geometric regions that is represented by the cracking-prone element 32a as a cracking-prone geometric region (78). For example, computing device 20 may execute imaging module 22 to locate respective geometric regions of component 30 that are represented by respectively identified cracking-prone elements of the plurality of elements 32a of finite element model 30a. In some examples, computing device 20 may visually identify cracking prone regions of component 30 by highlighting the cracking prone regions in a displayed image.

In some examples, an operator may then reduce or substantially prevent cracking at the identified cracking-prone regions when component 30 is subjected to the predetermined cooling operation by taking remedial steps to counter cracking at those regions. For example, the example technique of FIG. 3 may further include providing a protective shield 34 on or adjacent to component 30. As discussed above with reference to example system 50 of FIG. 2, protective shield 34 may have a predetermined shape configured to mitigate cracking at at least the cracking-prone geometric region 32 by reducing a local cooling rate, or by affecting a stress or temperature gradient in the cracking-prone geometric region 32, near the cracking-prone geometric region 32, or both. In some examples, computing device 20 may determine the geometry or configuration of protective shield 34, for example, by including a representation of one or more shields that may be placed on one or more regions of component 30 in finite element model 30a, and by modeling the predetermined cooling operation of component 30 with protective shield 34 using finite element analysis module 24. In some examples, the finite element model 30a comprises a first finite element model representing component 30, and a second finite element model includes the first finite element model and a representation of protective shield 34. Computing device 20 may determine, based on the second finite element model, for each respective time of the plurality of times, the respective stress $S_t$ and a respective temperature $T_t$ at each respective element of the plurality of respective elements during the predetermined cooling operation modeled using the second finite element model, the respective impact energy $E_T$, and the respective weakness index $W_t$, and the minimum weakness index $W_m$ associated with the respective element over the plurality of times. Thus, computing device 20 may identify the respective element 32 as a cracking-prone element if $W_m < W_{threshold}$. Thus, computing device 20 may evaluate the cracking propensity of component 30 after shielding component 30 with shield 34.

For example, computing device 20 may simulate the predetermined cooling operation for component 30 protected by different simulated candidate protective shields, and may identify candidate protective shields that result in preventing or reducing the geometric extent and number of cracking-prone elements. Protective shield 34 may be selected to have a geometry substantially corresponding to the geometry of the identified candidate protective shield, and may be placed on component 30 in a configuration substantially corresponding to the configuration of the simulated candidate protective shield with respect to finite element model 30a.

In some examples, the example technique of FIG. 3 may further include subjecting component 30 to the predetermined cooling environment for cooling component 30 at the predetermined cooling rate. In some examples, computing device 20 of example system 10 may control system 50 of FIG. 2, for example, by controlling a relative position, configuration, or orientation of component 30 with respect to cooling bath 38, by controlling the temperature and cooling operation of cooling bath 38, and by detecting signals from a temperature sensor or a temperature sensor array in contact with or adjacent component 30 or cooling bath 38. Protective shield 34 may reduce or substantially prevent cracking in component 30 during the cooling at the predetermined cooling rate. Thus, computing device 20 may be used to predict cracking-prone locations of quenched components using a computational representation of a component, avoiding the need to physically quench the actual component itself for testing purposes, and control quenching of the component protected by a shield to prevent cracking at the cracking-prone locations.

While in the example technique of FIG. 3, computing device 20 obtains impact energy based on temperature and cooling rate for a given metal or alloy from cooling rate-dependent energy curve data module 28, the data stored in cooling rate-dependent energy curve data module 28 may be updated or reset to include cooling rate-dependent energy relationships for a metal or alloy that was not previously stored in the data module 28, or update the data following a change the energy testing protocol, or to provide additional data points. The technique of FIG. 4 may be used to update cooling rate-dependent energy curve data module 28.

Figure 4:
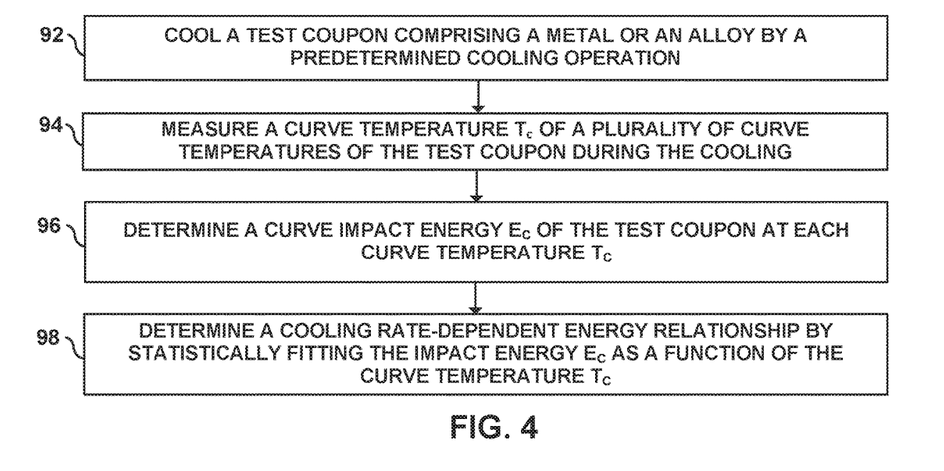
FIG. 4 is a flow diagram illustrating an example technique for updating a cooling rate-dependent energy curve data module.

FIG. 4 is a flow diagram illustrating an example technique for updating a cooling rate-dependent energy curve data module. The example technique of FIG. 4 may partly or wholly be performed by example system 10 of FIG. 1, and is described in some examples below with reference to example system 10. However, in some examples, one or more steps of the example technique of FIG. 4 may be performed by other systems. In some examples, the example technique of FIG. 4 may include controlling, by computing device 20, cooling of test coupon 42 by the predetermined cooling operation (92). In some examples, the example technique of FIG. 4 may include, by computing device 20 of example system 10 of FIG. 1, measuring a curve temperature $T_c$ of a plurality of curve temperatures of test coupon 42 during the cooling (94). For example, computing device 20 may receive at each respective time of a plurality of respective times, signals representing temperature $T_c$ of component 30 during the cooling operation, sensed by temperature sensor 52 of example system 10 of FIG. 1. In some examples, the example technique of FIG. 4 may include, by computing device 20, determining a curve impact energy of test coupon 42 associated with each temperature $T_c$ of the plurality of curve temperatures (96). For example, computing device 20 may receive at a respective time at which temperature sensor 52 senses temperature $T_c$, signals representing magnitude of curve impact energy $E_c$ sensed by energy sensor 54 of example system 10. In some examples, each impact by test probe 48 may result in deformation of destruction or deformation of test coupon 42, and test coupon 42 may be replaced with a replacement unit having substantially the same size and composition, for each respective impact test performed at different stages of cooling. As discussed above with reference to FIG. 1, determining the impact energy may include performing a Charpy test on test coupon 42, and the impact energy may be Charpy energy. In some examples, computing device 20 may control the operation of energy curve calibration system 40, for example, by controlling a position, orientation, or configuration of impact probe 48, a position, orientation, or configuration of test coupon 42, by controlling the temperature and cooling operation of cooling bath 44, and by detecting signals from temperature sensor 52 and energy sensor 54.

Thus, systems and techniques describes above may be used to predict cracking-prone locations of quenched components using a computational representation of a component, avoiding the need to physically quench the actual component itself for testing purposes, and control quenching of the component protected by a shield to prevent cracking at the cracking-prone locations. The accuracy of the prediction may be improved by incorporating the impact energy, for example, the Charpy energy, in a weakness index for predicting propensity for cracking in addition to incorporating the stress at that respective location in the weakness index.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer system-readable medium, such as a computer system-readable storage medium, containing instructions. Instructions embedded or encoded in a computer system-readable medium, including a computer system-readable storage medium, may cause one or more programmable processors, or other processors, to implement one or more of the techniques described herein, such as when instructions included or encoded in the computer system-readable medium are executed by the one or more processors. Computer system readable storage media may include random access memory (RAM), read only memory (RUM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer system readable media. In some examples, an article of manufacture may comprise one or more computer system-readable storage media.

EXAMPLES

Example 1

Figure 5:
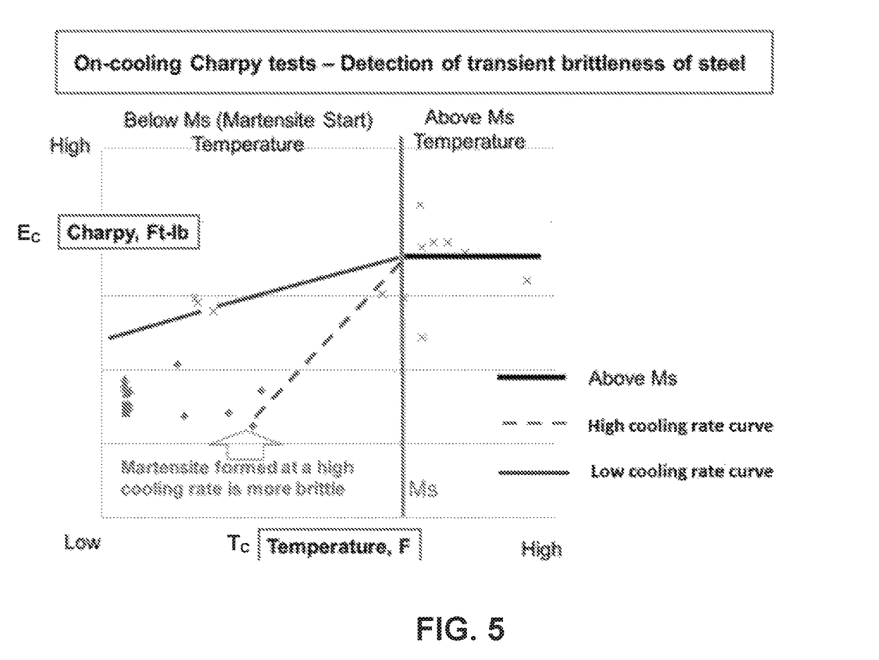
FIG. 5 is a chart illustrating two cooling rate-dependent energy curves for martensitic steel.

FIG. 5 is a chart illustrating two cooling rate-dependent energy curves, Ec, for martensitic steel. A high cooling rate curve was established by cooling a Charpy test coupon including martensitic steel, from an austenite temperature to room temperature, at a cooling rate of a magnitude of $10^1$ to $10^{2}$° F./s. The Charpy energy was determined at different temperatures, and a curve was plotted by statistically fitting a line through a plot of Charpy energy versus temperature, using the reasonable worst case (lowest Charpy energy). A low cooling rate curve was also established by cooling a Charpy test coupon including martensitic steel, from an austenite temperature to room temperature, at a cooling rate of a magnitude of $10^{0}$° F./s, and similarly plotting curve.

Various examples have been described. These and other examples are within the scope of the following claims.

The invention claimed is:

1. A method comprising:
   determining, by a computing device, based on a finite element model, for each respective time of a plurality of times, a respective stress $S_t$ and a respective temperature $T_t$ at each respective element of a plurality of respective elements during a predetermined cooling operation modeled using the finite element model, wherein the finite element model represents a component comprising a metal or an alloy, wherein the finite element model comprises the plurality of respective elements, and wherein each respective element of the plurality of respective elements represents a respective geometric region of a plurality of respective geometric regions of the component;
   determining, by the computing device, a respective impact energy $E_T$ for each respective element at each respective time, based on the respective temperature $T_t$ associated with the respective element at the respective time and a predetermined cooling rate-dependent energy relationship that relates a temperature of the metal or the alloy to an impact energy of the metal or the alloy cooled by the predetermined cooling operation;
   determining, by the computing device, for each respective element at each time t, a respective weakness index $W_t = [A \times E_T / S_t]^n$, wherein A is a predetermined constant and n is a predetermined real number greater than or equal to 1;
   determining, by the computing device, for each respective element of the plurality of respective elements, a minimum weakness index $W_m$ from the plurality of respective weakness indices associated with the respective element over the plurality of times; and
   identifying, by the computing device, the respective element as a cracking-prone element if $W_m < W_{threshold}$, wherein $W_{threshold}$ is a predetermined weakness index threshold.

2. The method of claim 1, further comprising identifying, by the computing device, a respective geometric region of the plurality of geometric regions that is represented by the cracking-prone element as a cracking-prone geometric region.

3. The method of claim 2, wherein the finite element model comprises a first finite element model, wherein a second finite element model comprises the first finite element model and a representation of a protective shield having a predetermined shape configured to mitigate cracking at the predetermined geometric region by reducing a local cooling rate in the vicinity of the predetermined geometric region, further comprising:

determining, by the computing device, based on the second finite element model, for each respective time of the plurality of times, the respective stress $S_t$ and a respective temperature $T_t$ at each respective element of the plurality of respective elements during the predetermined cooling operation modeled using the second finite element model;

determining, by the computing device, the respective impact energy $E_T$ for each respective element at each respective time, based on the respective temperature $T_t$ associated with the respective element at the respective time and the predetermined cooling rate-dependent energy relationship that relates a temperature of the metal or the alloy to the impact energy of the metal or the alloy cooled by the predetermined cooling operation;

determining, by the computing device, for each respective element at each time t, a respective weakness index $W_t=[A \times E_T/S_t]^n$, wherein A is a predetermined constant and n is a predetermined real number greater than or equal to 1;

determining, by the computing device, for each respective element of the plurality of respective elements, a minimum weakness index $W_m$ from the plurality of respective weakness indices associated with the respective element over the plurality of times; and     identifying, by the computing device, the respective element as a cracking-prone element if $W_m < W_{threshold}$, wherein $W_{threshold}$ is a predetermined weakness index threshold.

4. The method of claim 3, further comprising controlling, by the computing device, the temperature of a cooling bath and a position of the component to cool the component by the predetermined cooling operation, wherein the component is positioned adjacent to the protective shield in a position substantially similar to in the representation.

5. The method of claim 1, further comprising updating, by the computing device, the cooling rate-dependent energy curve data module by controlling an energy curve calibration system to:

cool a test coupon comprising the metal or alloy by the predetermined cooling operation;

measure a curve temperature $T_c$ of a plurality of curve temperatures of the test coupon during the cooling; and     determine a curve impact energy $E_c$ of the test coupon at each temperature $T_c$ of the plurality of curve temperatures.

6. The method of claim 5, wherein the energy curve calibration system is configured to perform a Charpy test on the test coupon, and wherein the impact energy is Charpy energy.

7. The method of claim 1, wherein the predetermined cooling operation comprises quenching the component, and wherein the component comprises martensitic steel.

8. The method of claim 1, wherein the magnitude of n is about 2.

9. The method of claim 1, further comprising:

positioning a protective shield adjacent the component; and     controlling, by the computing device, the temperature of a cooling bath to cool the component adjacent the protective shield by the predetermined cooling operation.

10. A system comprising:

a computing device comprising:

a predetermined cooling rate-dependent energy curve data module that relates a temperature of a metal or an alloy to an impact energy of the metal or the alloy cooled by a predetermined cooling operation; and     a finite element analysis module configured to, for a finite element model representing a component comprising the metal or the alloy, wherein the finite element model comprises a plurality of respective elements, wherein each respective element of the plurality of respective elements represents a respective geometric region of a plurality of respective geometric regions of the component:

determine, for each respective time of a plurality of times, a respective stress $S_t$ and a respective temperature $T_t$ at each respective element of the plurality of respective elements during a predetermined cooling operating; and         determine a respective impact energy $E_T$ for each respective element at each respective time, based on the respective temperature $T_t$ associated with the respective element at the respective time,         determine, for each respective element at each respective time, a respective weakness index $W_t=[A \times E_T/S_t]^n$, wherein A is a predetermined constant and n is a predetermined real number greater than or equal to 1,         determine, for each respective element of the plurality of respective elements, a minimum weakness index $W_m$ from the plurality of respective weakness indices associated with the respective element over the plurality of times, and         identify the respective element as a cracking-prone element if $W_m < W_{threshold}$, wherein $W_{threshold}$ is a predetermined weakness index threshold.

11. The system of claim 10, wherein the computing device is further configured to identify a respective geometric region of the plurality of respective geometric regions that is represented by the cracking-prone element as a cracking-prone geometric region.

12. The system of claim 11, wherein the finite element model comprises a first finite element model, wherein a second finite element model comprises the first finite element model and a representation of a protective shield having a predetermined shape configured to mitigate cracking at the predetermined geometric region by reducing a local cooling rate in the vicinity of the predetermined geometric region, and wherein the finite element analysis module is further configured to:

determine, based on the second finite element model, for each respective time of the plurality of times, the respective stress $S_t$ and a respective temperature $T_t$ at each respective element of the plurality of respective elements during the predetermined cooling operation modeled using the second finite element model;

determine the respective impact energy $E_T$ for each respective element at each respective time, based on the respective temperature $T_t$ associated with the respective element at the respective time and the predetermined cooling rate-dependent energy relationship that relates a temperature of the metal or the alloy to the impact energy of the metal or the alloy cooled by the predetermined cooling operation;

determine, for each respective element at each time t, a respective weakness index $W_t=[A \times E_T/S_t]^n$, wherein A is a predetermined constant and n is a predetermined real number greater than or equal to 1;

determine, for each respective element of the plurality of respective elements, a minimum weakness index $W_m$ from the plurality of respective weakness indices associated with the respective element over the plurality of times; and identify the respective element as a cracking-prone element if $W_m < W_{threshold}$, wherein $W_{threshold}$ is a predetermined weakness index threshold.

13. The system of claim 12, wherein the computing device is further configured to control the temperature of a cooling bath and a position of the component to cool the component by the predetermined cooling operation, wherein the component is positioned adjacent to the protective shield in a position substantially similar to in the representation.

14. The system of claim 10, further comprising an energy curve calibration system for updating the cooling rate-dependent energy curve data module, wherein the energy curve calibration system comprises:

a cooling bath for cooling a test coupon comprising the metal or alloy by the predetermined cooling operation;

a temperature sensor for measuring a curve temperature $T_c$ of a plurality of curve temperatures of the test coupon during the cooling; and an impact probe for subjecting the test coupon to a predetermined impact force for determining a curve impact energy $E_c$ of the test coupon at each temperature $T_c$ of the plurality of curve temperatures.

15. The system of claim 14, wherein the impact probe comprises a Charpy probe, and wherein the impact energy is Charpy energy.

16. The system of claim 10, wherein the magnitude of n is about 2.

17. A computer readable storage medium comprising instructions that, when executed, cause at least one processor to:

determine, based on a finite element model representing a component comprising a metal or an alloy, for each respective time of a plurality of times, a respective stress $S_t$ and a respective temperature $T_t$ at each respective element of a plurality of respective elements during a predetermined cooling operation, wherein the finite element model comprises the plurality of respective elements, and wherein each respective element of the plurality of respective elements representing a respective geometric region of a plurality of respective geometric regions of the component;

determine a respective impact energy $E_T$ for each respective element at each respective time, based on the respective temperature associated with the respective element at the respective time and a predetermined cooling rate-dependent energy relationship that relates a temperature of the metal or the alloy to an impact energy of the metal or the alloy cooled by the predetermined cooling operation;

determine, for each respective element at each respective time, a respective weakness index $W_t = [A \times E_T / S_t]^n$, wherein A is a predetermined constant and n is a predetermined real number greater than or equal to 1;

determine, for each respective element of the plurality of respective elements, a minimum weakness index $W_m$ from the plurality of weakness indices associated with the respective element over the plurality of times; and identify the respective element as a cracking-prone element if $W_m < W_{threshold}$, wherein $W_{threshold}$ is a predetermined weakness index threshold.

18. The computer readable storage medium of 17, further comprising instructions that, when executed, cause the at least one processor to identify a respective geometric region of the plurality of geometric regions that is represented by the cracking-prone element as a cracking-prone geometric region.

19. The computer readable storage medium of 17, wherein the finite element model comprises a first finite element model, wherein a second finite element model comprises the first finite element model and a representation of a protective shield having a predetermined shape configured to mitigate cracking at the predetermined geometric region by reducing a local cooling rate in the vicinity of the predetermined geometric region, and wherein computer readable storage medium further comprises instructions that, when executed, cause the at least one processor to:

determine, based on the second finite element model, for each respective time of the plurality of times, the respective stress $S_t$ and a respective temperature $T_t$ at each respective element of the plurality of respective elements during the predetermined cooling operation modeled using the second finite element model;

determine the respective impact energy $E_T$ for each respective element at each respective time, based on the respective temperature $T_t$ associated with the respective element at the respective time and the predetermined cooling rate-dependent energy relationship that relates a temperature of the metal or the alloy to the impact energy of the metal or the alloy cooled by the predetermined cooling operation;

determine, for each respective element at each time t, a respective weakness index $W_t = [A \times E_T / S_t]^n$, wherein A is a predetermined constant and n is a predetermined real number greater than or equal to 1;

determine, for each respective element of the plurality of respective elements, a minimum weakness index $W_m$ from the plurality of respective weakness indices associated with the respective element over the plurality of times; and identify the respective element as a cracking-prone element if $W_m < W_{threshold}$, wherein $W_{threshold}$ is a predetermined weakness index threshold.

20. The computer readable storage medium of 17, wherein the magnitude of n is about 2.

21. The computer readable storage medium of 17, wherein the impact energy is Charpy energy.

* * * * *